United States Patent [19]
Choinski et al.

[11] Patent Number: 5,433,138
[45] Date of Patent: Jul. 18, 1995

[54] TAMPER-RESISTANT BRAKE ACTUATOR

[75] Inventors: Graydon J. Choinski, Utica, Mich.; Allen L. Gummer, Santa Rosa, Calif.; David W. Brooks, Royal Oak, Mich.

[73] Assignee: Indian Head Industries, Inc., Charlotte, N.C.

[21] Appl. No.: 215,507

[22] Filed: Mar. 22, 1994

Related U.S. Application Data

[63] Continuation of Ser. No. 910,464, Jul. 8, 1992, Pat. No. 5,311,809.

[51] Int. Cl.⁶ .............................................. F01B 29/00
[52] U.S. Cl. .......................................... 92/128; 92/63; 24/20 EE; 24/20 CW; 29/509; 403/338
[58] Field of Search ................. 403/335, 338, 274, 282; 29/505, 509, 510, 515; 24/20 CW, 20 R, 20 EE, 20 TT; 285/365, 407, 384; 92/63, 128

[56] References Cited

U.S. PATENT DOCUMENTS

| | | |
|---|---|---|
| 3,295,176 | 1/1967 | Bright . |
| 3,909,919 | 10/1975 | Miyabayashi et al. ............ 29/521 |
| 4,106,799 | 8/1978 | Oetiker ............................ 285/365 |
| 4,222,155 | 9/1980 | Oetiker ............................ 285/407 |
| 4,430,775 | 2/1984 | Arthur ............................ 24/20 CW |
| 4,451,955 | 6/1984 | Kern et al. ..................... 24/20 EE |
| 4,695,080 | 9/1987 | Oetiker ............................ 285/365 |
| 4,832,380 | 5/1989 | Oetiker ............................ 285/407 |

*Primary Examiner*—Thomas E. Denion
*Attorney, Agent, or Firm*—Howard & Howard

[57] ABSTRACT

The present invention provides a tamper-resistant fluid-operated brake actuator having a power spring housed within a head or cap which is attached to a flange case having one or more diaphragms or pistons responsive to changes of fluid pressure within the brake actuator chambers. In one embodiment, the head is attached to the flange case by a substantially continuous curvilinear annular metal retaining member which must be inelastically deformed or destroyed in order to remove the head from the flange case, thus rendering tampering more difficult. In another embodiment, the annular metal retaining member of the present invention is integral with the actuator head and which is metal-spun or the like onto the flange case.

3 Claims, 3 Drawing Sheets

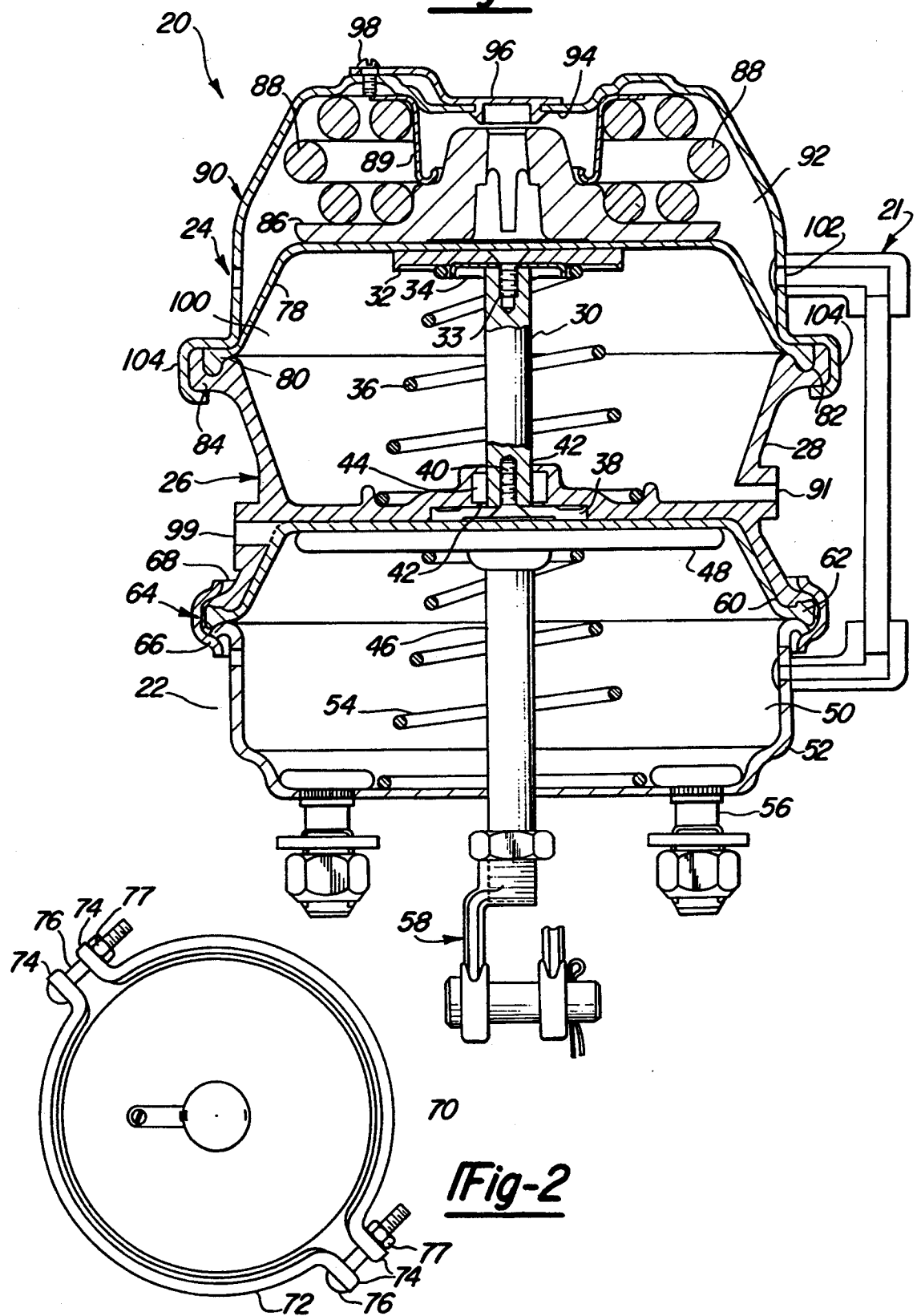

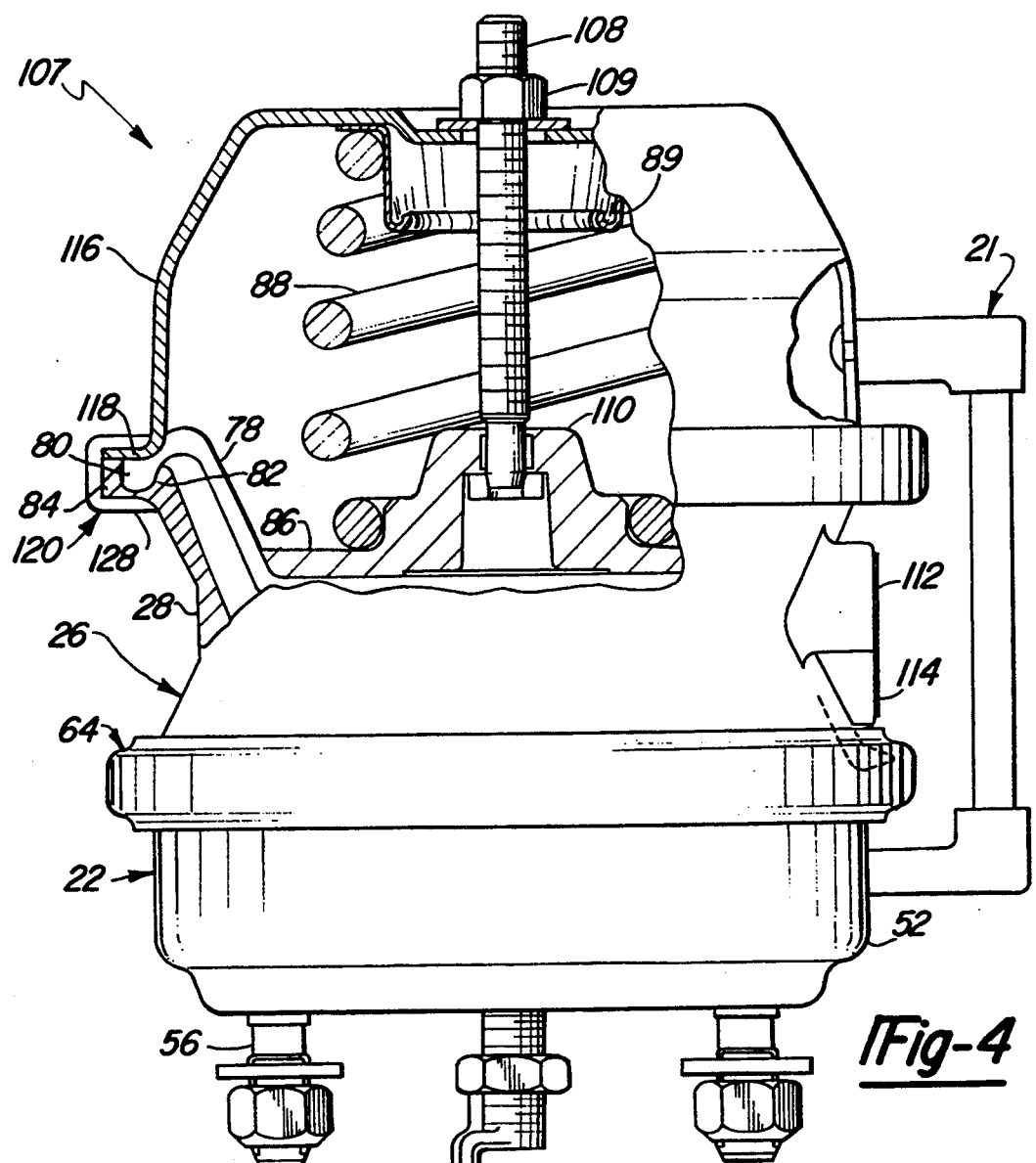
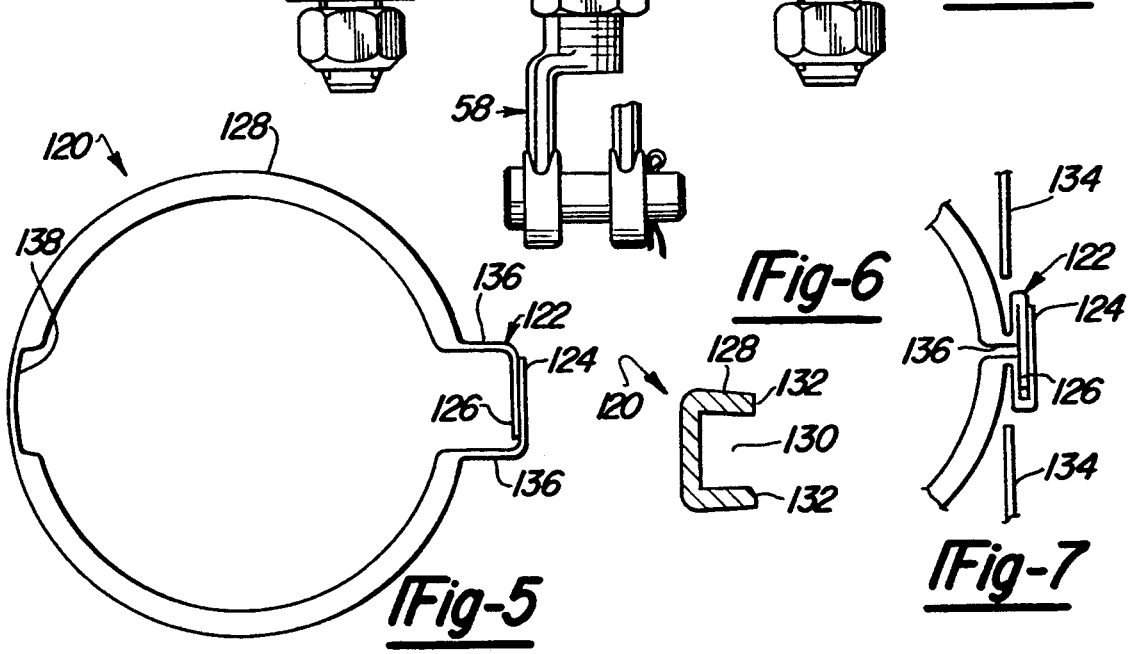

TAMPER-RESISTANT BRAKE ACTUATOR

This is a continuation of copending application Ser. No. 07/910,464 filed Jul. 8, 1992, now U.S. Pat. No. 5,311,809.

The present invention relates generally to braking systems and, more specifically, to fluid-operated brake actuators such as air brake actuators.

BACKGROUND OF THE INVENTION

Fluid-operated braking systems such as air brake systems have long been used to control the movement of motor vehicles in a safe and effective manner. In particular, air brakes are commonly used on commercial vehicles such as trucks which typically have large gross vehicle weights. The considerable inertial mass of these heavy-duty vehicles in combination with the high speeds at which they travel requires a braking system which responds rapidly with substantial braking power. One system component which is instrumental in the operation of air brake systems is the brake actuator. The brake actuator provides the force necessary when braking a vehicle. The assignee of the present invention produces a number of high-quality commercial air brake actuators, many of which actuate the normal service brakes as well as parking/emergency brakes. These brake actuators, also known as spring brakes, typically have a network of air chambers defined by one or more diaphragms or pistons and a plurality of springs which operate to provide the appropriate braking action in response to directives by the vehicle driver. In the event an air braking system loses pressure, the brake actuator automatically engages the vehicle brakes.

Brake actuators of this type, with or without a service brake section, have a powerful coil spring seated within a housing or head portion of the actuator. When compressed, the power spring exerts a biasing force in an axial direction relative to the housing. The power spring has a high spring constant such that, once compressed, it has a substantial amount of potential energy. When released, the stored energy of the spring is converted into kinetic energy to be used in the braking operation. However, premature removal of the actuator head, that is, removal of the head while the power spring is compressed, may cause this energy to be released in an undesirable manner. For example, the actuator cap or head assembly is typically attached to the flange case using a single or multiple section ring clamp, the clamp being secured in position by one or more retaining bolts. In the field, the injudicious removal of these retaining bolts may release the ring clamp causing the head or cap to detach from the case flange. Once released, the immense energy of the spring is transmitted to the actuator head which is propelled away from the flange case with considerable force. Hence, the air pressure which retains the power spring in its compressed state must be dissipated prior to the removal of the clamp, and the power spring must be "caged" within the head. Moreover, these prior art clamp rings can be difficult to position when assembling the actuator.

Typically, instructions are attached to the brake actuators to inform those attempting inspection or repair of the presence of the power spring and of the consequences which may result from tampering with the head retaining ring clamp when the power spring is in the compressed state, evidencing recognition by the art of the tampering problem. However, it would still be desirable to provide a device for attaching the actuator head to the flange case in a manner which would prevent removal in the field.

Restraining and clamping devices have been proposed by others for addressing the improvident detachment of a brake actuator head from the flange case. In U.S. Pat. No. 4,565,120, a device for restraining the separation of brake actuator housings is disclosed which consists of a sheet metal body having a notch which receives the housing flanges. The notch is large enough to permit partial separation of the housing flanges upon release of the flange clamp band. A number of clamping bands are also known such as those disclosed in U.S. Pat. Nos. 3,106,757, CLAMP STRUCTURE FOR METAL BANDS, 3,295,176, HOSE CLAMPS, 4,583,773, RELEASABLE TUBULAR CLAMPS FOR THE CONNECTION OF CYLINDRICAL OR PROFILED TUBES, 4,451,955, CRIMP-TYPE CLAMP, 4,430,775, MUFFLER SHIELD BANDING STRAP, 3,602,954, ANNULAR HOSE CLIP, 2,541,205, and 4,109,350, CLAMP BAND. For a variety of reasons, none of these latter clamping devices, however, are appropriate for providing a tamper-resistant brake actuator, nor is any such use disclosed or suggested by these references which are considered to be non-analogous art with respect to brake actuators. Thus, to meet this need, the present invention provides a reliable tamper-resistant fluid-operated brake actuator.

SUMMARY OF THE INVENTION

In accordance with the present invention, a tamper-resistant fluid-operated brake actuator is provided which includes a head or cap which encloses a power spring that is intermittently compressed by an air-actuated diaphragm and piston which form a moveable wall. The brake actuator head is attached to the flange case by an annular metal retaining member having either a substantially continuous or axially slotted curvilinear shape. The annular metal retaining member is partially formed in place on the flange of the flange case, attaching the head such that the annular metal retaining member must be cut or otherwise inelastically deformed for the head to be removed from the flange case. In one aspect, the annular metal retaining member of the inventive tamper-resistant brake actuator comprises a metal-spun or crimped rim or ring integral with the actuator head. Suitable forming methods in addition to metal spinning and the like are also provided. In this embodiment, the annular metal retaining member is spun or crimped onto the flange case providing dependable tamper-resistant attachment of the head to the flange case. The head or cap having the integral annular metal retaining member may be suitably spun or crimped onto the flange case using a lathe or equivalent device and an appropriate tool using conventional metal spinning or coining techniques. Also, a press-type device and appropriate fixturing for metal crimping techniques may be used. Forming methods other than metal spinning or crimping may be suitable.

In another embodiment of the present invention, the tamper-resistant brake actuator of the present invention includes an annular metal retaining member which is a unitary element that comprises a clamping ring which is fitted onto the abutting rim and flange of the head and flange case. After the clamping ring is placed in its initial position on the flange and rim, it is deformed beyond its elastic limit at a tensioning portion to form a tamper-resistant attachment of the head to the flange case. In this embodiment, the annular metal retaining member preferably includes a recessed or cut-out section which provides a flex region which facilitates installation. Chamfered ring surfaces which mate with the rim flange are also preferably provided to permit easy attachment of the deformable retaining member.

BRIEF DESCRIPTION OF THE DRAWINGS

FIG. 1 is a cross-sectional side elevational view of the tamper-resistant brake actuator of the present invention.

FIG. 2 is a top view of the brake actuator shown in FIG. 1 illustrating a clamping band having two retaining bolts for the service brake section.

FIG. 4 is a side elevational view of the brake actuator of the present invention in another embodiment with a portion of the actuator broken away, the broken-away portion being shown in cross-section.

FIG. 5 is a top view of one embodiment of the deformable retaining member of the present invention.

FIG. 6 is a side elevational view of the deformable retaining member of FIG. 5 shown in cross-section.

FIG. 7 illustrates the tensioning of the deformable retaining member shown in FIG. 5.

DESCRIPTION OF THE PREFERRED EMBODIMENT

Figure 3:
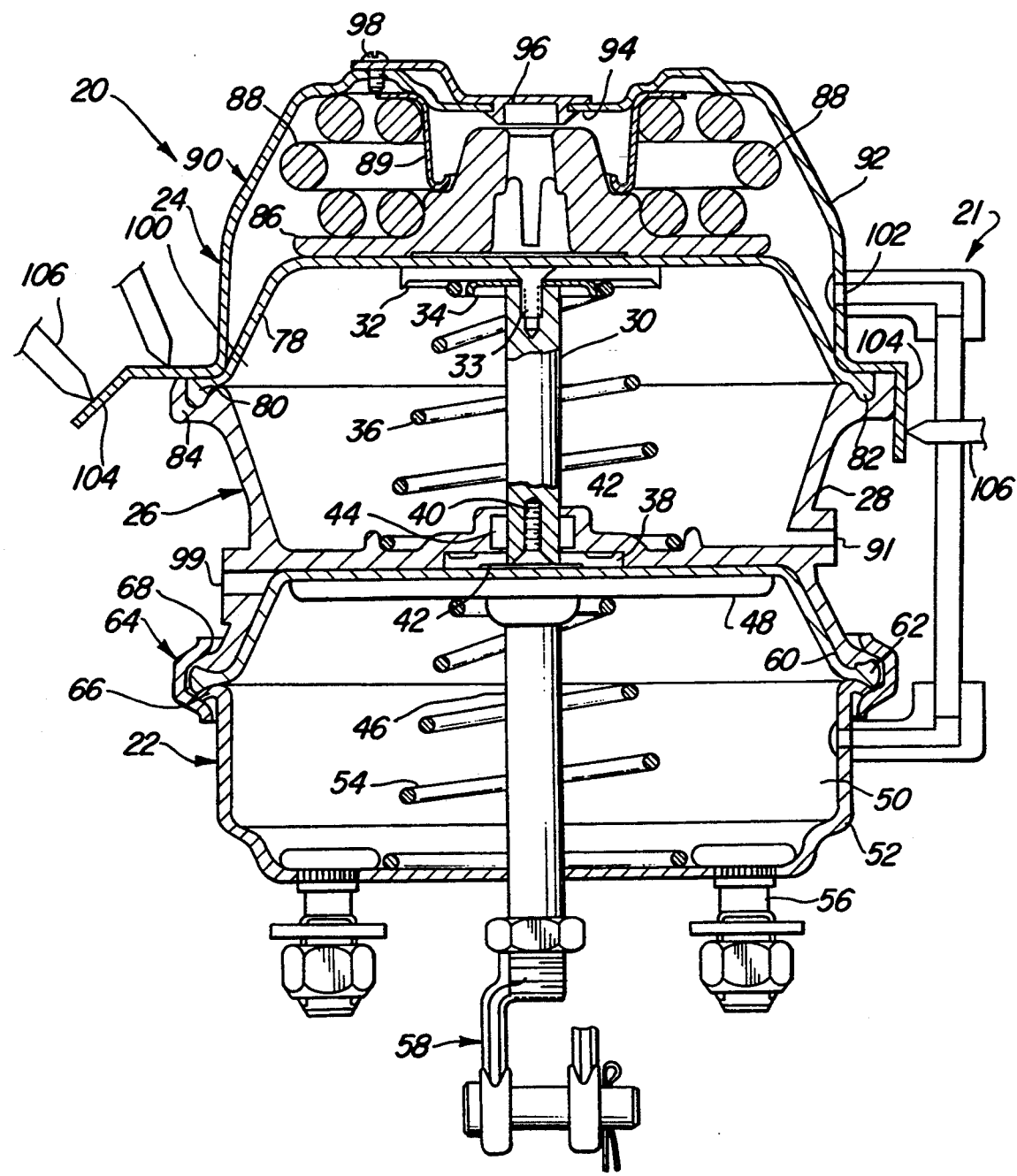
FIG. 3 is a cross-sectional side elevational view of the brake actuator depicted in FIG. 1 in an intermediate stage of fabrication.

Referring now to FIG. 1 of the drawings, in one embodiment of the present invention, brake actuator 20 is shown generally, illustrated here as a double-diaphragm air brake actuator having an external tube breather system 21. Brake actuator 20 includes service chamber assembly 22 and spring chamber assembly 24. Flange case and push rod subassembly 26 is shown having flange case 28 and push rod 30. Connected by push rod plate retaining screw 33 to one end of push rod 30 is spring side push rod plate 32. Spring guide 34 is provided to hold return spring 36 in position. To the other end of push rod 30, service side push rod plate 38 is attached by push rod plate retaining screw 40. During operation, push rod 30 moves axially in relation to flange case 28 on the bearing surfaces of push rod guide bushings 42 in contact with push rod case seal 44. Service chamber assembly 22 similarly includes push rod 46 to which service side piston 48 is attached. Non-pressure chamber 50 is defined by service housing 52 which encloses return spring 54. Conventional mounting bolts 56 and yoke assembly 58 are also shown. Other brake actuator assemblies may be suitable in the present invention.

As will be understood by those skilled in the art, fluid or "air brakes" of this nature are controlled by the movement of one or more flexible diaphragms and rigid piston plates which combine to form a moveable wall when actuated by air pressure differentials created in the various chambers of brake actuator 20. Hence, brake actuator 20 is equipped with diaphragm 60 having an expanded outside diameter portion or simply expanded portion 62 in the nature of an integral O-ring or the like. Diaphragm 60 forms a hermetic or air-tight seal by the compression of expanded portion 62 at the interface of service housing 52 and flange case 28. Hence, diaphragm 60 is formed of a resilient material such as rubber, neoprene, fabric-center reinforced neoprene or the like. In order to obtain this compression of expanded portion 62 and to attach service housing 52 to flange case 28, clamping ring 64 is positioned over annular flange portion 66 of housing 52 and annular flange portion 68 of flange case 28.

Clamp ring 64 is shown more fully in FIG. 2 having two semicircular portions 70 and 72 each having tabs or ears 74 through which clamp retaining bolts 76 are inserted to tighten clamp 64 in position by tightening retaining nuts 77 on bolts 76. This is, clamp 64 secures housing 52 to flange case 28 and compresses expanded portion 62 of diaphragm 60 forming an air-tight seal. This conventional construction of clamp 64 is suitable for the attachment of housing 52 to flange ease 28 since return spring 54 is not a power spring. One piece, single-bolt clamps of this type are also known.

Returning to FIG. 1 of the drawings, spring side diaphragm 78 is shown having expanded portion 80 which is again in the nature of an integral O-ring or the like. Portion 80 is seated in annular groove 82 of annular flange 84 of flange case 28. Thus, spring side push rod plate 32 is adjacent one side of diaphragm 78 while spring side piston 86 is adjacent the other side of diaphragm 78. Brake actuator 20 is shown in FIG. 1 in the normal driving mode. In this mode and in the normal service brake mode, spring side piston 86 compresses heavy-duty power spring 88 within cap or head 90 by virtue of the air pressure exerted on diaphragm 78 through inlet 91. Diaphragm 78 and spring side piston 86 form a first moveable wall held in the illustrated position by air pressure in this mode of operation. A head assembly 92 is thus defined by head 90 and diaphragm 78. Head 90 is provided with aperture 94 shown closed with dust cover or plug 96 secured to head 90 by dust plug screw 98 and retained on head 90 with an interference fitting, annular lined flange. Aperture 94 provides access to piston 86 using a release bolt (not shown in FIG. 1).

In the normal service brake mode, air is injected through inlet 99 causing diaphragm 60 and service side piston 48 to move downwardly. It will be understood that diaphragm 60 and service side piston 48 form a second moveable wall which is air-pressure responsive. The downward movement of this second moveable wall causes push rod 46 to thrust out from service housing 52 to set the vehicle brakes.

Hence, when chamber 100 is sufficiently pressurized with air which is supplied through inlet 91, the moveable wall formed by diaphragm 78 and thus spring side piston 86 are held in the position shown in FIG. 1 so that power spring 88 is, as stated, substantially compressed within head assembly 92. In this state, power spring 88 has a considerable amount of stored or potential energy. When chamber 100 is depressurized, diaphragm 78 no longer holds spring side piston 86 which in response to the depressurization moves axially with relation to push rod 30. In turn, the movement of push rod 30 causes push rod 46 to thrust out from service housing 52. It is this movement of push rod 46 which actuates or sets the vehicle brakes. When the movement of push rod 46 is caused by the expansion of power spring 88, brake actuator 20 is in the parking or emergency brake mode. In this mode, springs 36 and 54 are compressed. It will therefore be understood that the spring constant of power spring 88 is much greater than that of springs 36 and 54 in combination. As diaphragm 78 moves in response to the depressurization of chamber 100 and the movement of spring side piston 86, air must enter head assembly 92. This is achieved through vents 102 in head 90 via external tube breather system 21 which reduces the uptake of atmospheric debris and the like.

Hence, it is necessary that power spring 88 be compressed between piston 86 and head 90 during normal driving and normal service brake mode. In these modes, power spring 88 exerts substantial force on head 90 in the direction away from flange case 28. Although devices similar to clamping ring 70 shown in FIG. 2 have in the past been used to connect or clamp head 90 to flange case 28 at flanges 84, as discussed earlier, improvident removal of such a clamp ring, which can be accomplished simply by removing retaining nut 77, will cause head 90 to separate from flange case 28 with considerable force. Improvident removal of head 90 is avoided by the present invention by providing an annular metal retaining member 104 which, in this embodiment, is an integral portion of head 90.

Still referring to FIG. 1 of the drawings, deformable retaining member 104 is shown in position on flange portion 84 of flange case 28 compressing expanded portion 80 of diaphragm 78 to form an hermetic or air-tight seal. Hence, head 90 cannot be removed from flange case 28 except by bending, prying, cutting or otherwise deforming or destroying retaining member 104 to remove it from flange 84. That is, flange 84 fits within a groove or channel defined by and coextensive with said retaining member 104 and is securely assembled by spinning or bending retaining member 104 over flange 84. It will be understood that retaining member 104 and, as stated, flange 84 are annular or ring-shaped, which may be a solid or interrupted section, such as an axially slotted configuration which facilitates crimping, extending around the circumference or perimeter of brake actuator 20. Thus, the opportunity for the removal created by retaining bolt-type clamps is avoided. Not only will field removal be unlikely due to the increased difficulty of removing head 90, the prospect of reattaching head 90 to flange case 28 without specialized tools, provides further deterrence to tampering.

Although other methods of forming retaining member 104 in place on flange 84 may be suitable, it is preferred that the attachment be made by metal spinning, crimping, coining, or over-center forming techniques which will be familiar to those skilled in the art.

Referring now to FIG. 3 of the drawings, brake actuator 20 is seen with retaining member 104 shown in an intermediate stage of construction. Head 90 has been placed in position on flange case 28. Note that the brake actuator 20 is shown in FIG. 3 having power spring 88 in the compressed mode, caged by release bolt 108. With head 90 in position having retaining member 104 projecting over or overlying flange 84, retaining member 104 is deformed beyond its elastic limit using tool 106 during metal spinning or forming to fasten retaining member 104 around flange 84. An alternate method would use a press to crimp a slotted retaining member around flange 84. The metal spinning operation may be suitably carried out using a lathe or equivalent device in the customary manner. Although steel is the metal of choice for forming head 90 and retaining member 104 due to its easy machineability, other metals may be suitable. Head 90 is thus securely attached to flange case 28 by way of spun-on retaining member 104 or a crimped on retaining member in a tamper-resistant manner.

In another embodiment of the present invention and referring now to FIG. 4 of the drawings brake actuator 107 is shown generally, again of the double diaphragm type. Like elements are designated using the same reference numerals as in the embodiment shown in FIGS. 1 through 3. Also, it is to be understood that while the present invention is described in connection with a specific type of brake actuator and has been illustrated with reference to a double diaphragm brake actuator, other fluid brake actuators may be made in accordance with the present invention such as piston type brake actuators, without regard to the type of brakes, cam, disc or wedge, actuated by the brake actuator and with or without external tube breather systems. The present invention is adaptable to virtually any brake actuator wherein a head which houses a spring is joined to a flange case or the like and all of these devices are intended to come within the scope of the present invention.

Detachable release bolt 108 is shown in FIG. 4 having been inserted into slot 110 of piston 86. Release bolt 108 is used to manually release the vehicle brakes when it is necessary to move the vehicle in the absence air pressure or to reline the brakes. Note that release bolt 108 has been inserted into position but release nut 109 has not yet been rotated to draw piston 86 toward spring guide 89. Ports 91 and 99 through which the brake actuator chambers are pressurized and depressurized are also shown. Having a different configuration than head 90 of FIGS. 1 and 3, cap or head 116 is shown, again having an exhaust port 102 with associated external tube breather system 21. In this embodiment, head 116 is provided with a radially extending annular lip or rim 118. Rim 118 extends completely around the perimeter of head 116. Flange 84 and flange case 28 have the same construction as shown in FIGS. 1 and 3, including annular groove or recess 82 in which expanded portion 80 of diaphragm 78 resides. However, annular metal retaining member 120 is shown comprising a unitary structure separate from head 116. Again, annular metal retaining member 120 provides tamper-resistant closure or attachment of head 116 to flanges case 28. Retaining member 120 in this embodiment is in the nature of a circular channel clamp which receives rim 118 and flange 84 thereby causing the compression of expanded portion 80 of diaphragm 78.

Retaining member 120 will be better understood with reference to FIG. 5 of the drawings which shows retaining member 120 detached from its position on brake actuator 20. In this embodiment, retaining member 120 comprises a ring of metal such as steel or the like and includes tensioning or compression portion 122 which is formed by joining ends 124 and 126 of body 128 of retaining member 120. Any number of means may be used to join ends 124 and 126 as long as a strong connection is formed as by spot welding or the like. With reference now to FIG. 4, retaining member 120 is placed in position such that it receives abutting rim 118 and flange 84 of brake actuator and groove or channel 130, channel 130 being shown best in FIG. 6, which is a cross-section of ring body 128. Also, as shown in FIG. 6, chamfered or beveled surfaces 132 are provided to facilitate the installation of retaining member 120 onto abutted rim 118 and flange 84. That is, chamfered surfaces 132 act as guides or the like so that retaining member 120 can be easily installed onto rim 118 and flange 84. It is to be understood that the inner diameter of the ring or circle formed by body 128 is "over-sized" to facilitate the placement of retaining member 120 over the flange 84 and rim 118. Once retaining member 120 is in its initial position, referring now to FIG. 7, tools 134 are used to crimp tensioning portion 122 to tighten body 128 around rim 118 and flange 84 so that head 116 is tightly attached to flange case 28. That is, sections 136 of tensioning portion 122 are deformed beyond their elastic limit using tools 134 so that body 128 of retaining member 120 is drawn snugly around head 116 and flange case 28 reducing the diameter of deformable retaining member 120. Thus, once fastened into position, retaining member 120 can be removed only by deforming body 128 or tensioning portion 122 beyond their elastic limit or otherwise destroying retaining member 120. It is preferred that body 128 be provided with recess 138 shown in FIG. 5 which is simply a reduced portion of body 128. Bend relief or recess 138 provides a flex point by which body 128 can be slightly flexed to facilitate installation around head rim 118 and flange case 28 and to provide even compression during assembly.

While the preferred embodiment of the present invention has been described so as to enable one skilled in the art to practice the techniques of the present invention, the description of the preferred embodiments is intended to be exemplary and does not limit the scope of the invention in any manner.

What is claimed is:

1. A clamp which is to be deformed to secure two housing portions together comprising:

an elongated member, being generally cylindrical and centered about a central axis, said elongated member having a cross-section which defines a channel to hold two housing parts together in a plane passing through said central axis, said elongated member cross-section including a back portion extending generally parallel to said central axis of said elongated member and two legs extending radially inwardly towards said central axis from said back portion, said legs extending at an angle from said back portion such that an included angle between said back portion and said leg is less than or equal to 90°, and the two housing parts which are held together by said elongated member including at least a first housing part having a first portion extending generally radially outwardly from a central axis and a second portion extending from the first portion in an axial direction, the other of the housing parts, including only a first portion extending radially outwardly, and abutting an end of the second portion of the first housing part such that said two legs on said elongated member can be placed outwardly of the first portion of the first housing member and the first portion of the second housing member with said back portion of said elongated member extending along the second portion of the first housing member;

said elongated member having two separate ends which are deformable together to secure the two housing portions within said channel;

and wherein a recessed portion is positioned at a location diametrically opposed from said ends and said recessed portion facilitating flexing of said elongated member.

2. A claim as recited in claim 1, wherein said two ends have a first portion extending generally radially outwardly from said central axis, and then extend perpendicular to said first portion, and then parallel to a tangent to the other periphery of said elongated body, said first portions being deformable.

3. A clamp which is to be deformed to secure two housing portions together comprising:

an elongated member, being generally cylindrical and centered about a central axis, said elongated member having a cross-section which defines a channel to hold two housing parts together in a plane passing through said central axis;

said elongated member having two separate ends which are deformable together to secure the two housing portions within said channel, said elongated member of cross-section including a back portion extending generally parallel to a central axis of said elongated member and two legs extending radially inwardly toward said central axis;

wherein said two ends have a first portion extending generally radially outwardly from said central axis, and then extend perpendicular to said first portion, and then parallel to a tangent to the outer periphery of said elongated body, said first portions being deformable; and wherein a recessed portion is positioned at a diametrically opposed location from said ends, said recessed portion having a smaller cross-sectional shape than the portion of said elongated member between said ends and said recessed portion, said recessed portion facilitating the placement of said clamp on the two housing members.

* * * * *